US009121782B2

(12) United States Patent
Amano et al.

(10) Patent No.: US 9,121,782 B2
(45) Date of Patent: *Sep. 1, 2015

(54) DETECTION DEVICE, ELECTRONIC APPARATUS, AND ROBOT

(71) Applicant: SEIKO EPSON CORPORATION, Tokyo (JP)

(72) Inventors: Takahiro Amano, Suwa-gun (JP); Tomo Ikebe, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,297

(22) Filed: Feb. 3, 2014

(65) Prior Publication Data

US 2014/0144253 A1     May 29, 2014

Related U.S. Application Data

(62) Division of application No. 13/240,244, filed on Sep. 22, 2011, now Pat. No. 8,707,802.

(30) Foreign Application Priority Data

Oct. 22, 2010 (JP) ................................ 2010-237153

(51) Int. Cl.
    *G01D 7/00*      (2006.01)
    *G01L 1/04*      (2006.01)
    (Continued)

(52) U.S. Cl.
CPC ................. *G01L 1/04* (2013.01); *B25J 13/083* (2013.01); *G01L 1/02* (2013.01); *G01L 1/205* (2013.01); *G01L 5/009* (2013.01); *G06F 3/0414* (2013.01)

(58) Field of Classification Search
CPC ........ G01L 1/146; G01L 1/205; G06F 3/0414
USPC ............................... 73/862.041–862.046, 760
See application file for complete search history.

(56) References Cited

U.S. PATENT DOCUMENTS 4,323,740 A     4/1982    Balash
4,953,410 A     9/1990    Tabota
(Continued)

FOREIGN PATENT DOCUMENTS

JP      A-60-135834     7/1985
JP      A-07-128163     5/1995
(Continued)

OTHER PUBLICATIONS

Jul. 17, 2013 Office Action issued in U.S. Appl. No. 13/240,244.
(Continued)

*Primary Examiner* — Max Noori
(74) *Attorney, Agent, or Firm* — Oliff PLC

(57) ABSTRACT

A first substrate that includes pressure sensors which are disposed in plural around a reference point; an approximately hemispherical elastic protrusion that is positioned so that the center of the elastic protrusion is approximately disposed in a position which is overlapped with the reference point, and is elastically deformed by an external force; and a second substrate that is separated from the elastic protrusion and installed on a side which is opposite to the first substrate are provided. When the external force is applied, a predetermined calculation is performed by using a pressure value which is detected through each pressure sensor, and the direction and the intensity of the applied external force are obtained.

10 Claims, 13 Drawing Sheets

(51) Int. Cl.
  *B25J 13/08* (2006.01)
  *G01L 1/02* (2006.01)
  *G01L 1/20* (2006.01)
  *G01L 5/00* (2006.01)
  *G06F 3/041* (2006.01)

(56) References Cited

U.S. PATENT DOCUMENTS

| | | | |
|---|---|---|---|
| 6,710,267 | B2 | 3/2004 | Natsuyama et al. |
| 7,057,875 | B2 | 6/2006 | Fujiyama et al. |
| 7,129,584 | B2 | 10/2006 | Lee |
| 8,707,802 | B2 | 4/2014 | Amano et al. |
| 2004/0160235 | A1 | 8/2004 | Okada et al. |
| 2007/0040107 | A1 | 2/2007 | Mizota et al. |
| 2010/0134428 | A1 | 6/2010 | Oh |
| 2012/0072131 | A1 | 3/2012 | Ikebe |
| 2012/0096952 | A1 | 4/2012 | Amano et al. |
| 2012/0144932 | A1* | 6/2012 | Ikebe et al. .............. 73/862.041 |
| 2012/0198945 | A1* | 8/2012 | Yoneyama ................ 73/862.042 |
| 2013/0021544 | A1* | 1/2013 | Fukuyama et al. ............. 349/12 |

FOREIGN PATENT DOCUMENTS

| | | |
|---|---|---|
| JP | A-2007-187502 | 7/2007 |
| JP | A-2007-518966 | 7/2007 |
| JP | A-2008-164557 | 7/2008 |
| JP | B2-4364146 | 11/2009 |
| WO | WO 2005/029028 A1 | 3/2005 |

OTHER PUBLICATIONS

Jul. 10, 2013 Office Action issued in U.S. Appl. No. 13/188,996.
U.S. Appl. No. 13/188,996 in the name of Ikebe filed Jul. 22, 2011.
U.S. Appl. No. 13/233,500 in the name of Ikebe filed Sep. 15, 2011.
Office Action dated Jul. 30, 2014 issued in U.S. Appl. No. 13/188,996.
Feb. 9, 2015 Office Action issued in U.S. Appl. No. 13/188,996.
Feb. 5, 2015 Office Action issued in U.S. Appl. No. 13/233,500.
Dec. 2009, A Brief Introduction of Development Status of Flexible Array Type Pressure Sensors, Spacecraft Environment Engineering, vol. 26 Supplement 112, pp. 1-13.

* cited by examiner

DETECTION DEVICE, ELECTRONIC APPARATUS, AND ROBOT

This application is a divisional of application Ser. No. 13/240,244 (now U.S. Pat. No. 8,707,802), filed Sep. 22, 2011, which claims priority to Japan Patent Application No. 2010-237153 filed Oct. 22, 2010, the entire disclosures of which are hereby incorporated by reference in their entireties.

BACKGROUND

1. Technical Field

The present invention relates to a detection device, an electronic apparatus, and a robot.

2. Related Art

As a device that detects an external force, detection devices as described in JP-A-2008-164557, JP-A-2007-187502, and Japanese patent No. 4364146 are known. It has been considered to apply the detection devices to a tactile sensor or the like of a touch panel or a robot.

In the detection device of JP-A-2008-164557, a plurality of contacts, which includes a bulged portion, is installed on a surface of a pressure-sensitive element. In addition, the pressure distribution and the pressure in a horizontal direction are detected from a load applied to each contact or a movement of each contact. However, in the detection device of JP-A-2008-164557, since the contact is exposed, for example, when an external pressure is applied to a region between two adjacent contacts, the two adjacent contacts are inclined in directions opposite to each other. That is, a detection error occurs such as detecting the direction opposite to the direction in which the external pressure is applied. Therefore, the external pressure which is applied to the detection device cannot be appropriately detected.

In the detection device of JP-A-2007-187502, a spherical or hemispherical elastic body in which a tip portion thereof faces a pressure-sensitive element side is installed on a surface of the pressure-sensitive element. In addition, the intensity and the direction of an external pressure are detected from a deformation of the elastic body and a variation in a position of the center of gravity of the elastic body. However, in the detection device of JP-A-2007-187502, since the elastic body and the pressure-sensitive element are not bonded to each other, for example, when the external pressure in a horizontal direction is applied to the elastic body, the center of gravity of the elastic body and a reference position of the pressure-sensitive element are deviated from each other and do not return to the original position. In a state where the deviation between the center of gravity of the elastic body and the reference position of the pressure-sensitive element remains, there is a problem in that the intensity of the external pressure in the horizontal direction cannot be appropriately measured.

In the detection device of Japanese patent No. 4364146, a columnar body and a pressure-receiving sheet are installed on a surface of a pressure-sensitive element, and the columnar body and the pressure-receiving sheet are bonded to each other. Therefore, when the external pressure is applied to the pressure-receiving sheet, stress is concentrated in the bonded portion between the pressure-receiving sheet and the columnar body. Thus, there are problems in that the bonded surface between the columnar body and the pressure-receiving sheet is easily collapsed and the durability is deteriorated.

SUMMARY

Application 1

According to an aspect of the invention, there is provided a detection device including: a first substrate that includes pressure sensors which are disposed in plurality around a reference point; an elastic protrusion that is positioned so that the center of gravity of the elastic protrusion is disposed in a position which is overlapped with the reference point, and is elastically deformed by an external pressure; and a second substrate that is separated from the elastic protrusion and installed on a side which is opposite to the first substrate, wherein the elastic protrusion is formed on the first substrate so that a tip portion of the elastic protrusion makes contact with the second substrate, and a direction and a intensity of an external pressure, which is applied from the second substrate side, are detected in a state where the tip portion of the elastic protrusion makes contact with the second substrate.

According the detection device of the aspect of the invention, when the external pressure is applied to a surface of the second substrate, the elastic protrusion is compressively deformed. At this time, when a sliding force component in a predetermined direction in the surface (a force component in a direction which is parallel to a surface of the pressure sensor) exists, the center of gravity of the elastic protrusion is deviated from the reference point and moved to a predetermined direction (the sliding direction). Therefore, among the plurality of pressure sensors, a relatively great pressure value is detected at the pressure sensor which is disposed in the position which is overlapped with the center of gravity of the elastic protrusion, and a relatively small pressure value is detected at the pressure sensor which is disposed in the position which is not overlapped with the center of gravity of the elastic protrusion. Thus, a difference between the pressure values, which are detected by the pressure sensors, is calculated, and the direction and the intensity in which the external pressure is applied can be obtained based on the difference.

Therefore, it is possible to provide the detection device having an improved durability and capable of detecting the direction and the intensity in which an external pressure is applied with high accuracy.

Application 2

In the detection device of the aspect of the invention, the detection device may further include a calculation device, the calculation device calculates a difference between pressure values detected by the pressure sensors which are arbitrarily combined, among pressure values which are detected by the plurality of pressure sensors due to the fact that the elastic protrusion is elastically deformed by the external pressure, and calculates the direction and the intensity of the applied external pressure based on the difference.

Application 3

In the detection device of the aspect of the invention, the elastic protrusion may be formed of a resin material having a predetermined hardness, and may be hemispherical.

In the approximately hemispherical elastic protrusion, since a tip portion thereof faces the second substrate and is disposed in the first substrate, even in a state where the sliding force is applied to the elastic protrusion, it is difficult to generate the deviation of the horizontal position of the contact surface of the elastic protrusion, which comes into contact with the first substrate. Therefore, after the sliding force is applied and the center of gravity and the reference position of the elastic body are deviated from each other, even in a state where the sliding force is not applied, it is possible to decrease a residual of the deviation between the center of gravity of the elastic protrusion and the reference position, or prevent the deviation from remaining.

In addition, since the tip of the approximately hemispherical elastic protrusion, which is disposed so as to face the second substrate, is a curved surface, when the external force is applied to the second substrate, a stress concentration in a certain portion of the elastic protrusion can be suppressed, and the durability can be improved.

Application 4

In the detection device of the aspect of the invention, the plurality of pressure sensors may be disposed to be point symmetrical with respect to the reference point.

According to the detection device of the aspect of the invention, since the distances between the reference point and the pressure sensors are the same as each other, the relationship between variations in positions of the center of gravity of the elastic protrusion and the pressure values detected by the pressure sensors becomes the same as each other.

For example, when the plurality of pressure sensors is disposed at distances which are different to each other from the reference point, even though variations in the positions of the center of gravity of the elastic protrusion are the same as each other, the pressure values, which are detected by the pressure sensors, are different to each other. Therefore, when the difference between the detection values is calculated, a correction factor is necessary according to the disposition position of each pressure sensor.

However, according to the configuration of the aspect of the invention, since the relationship between variations in the positions of the center of gravity of the elastic protrusion and the pressure values which are detected by the pressure sensors becomes the same as each other, the correction factor is not necessary. Therefore, the direction and the intensity of the external pressure are easily calculated from the pressure value which is detected by each pressure sensor, and the external pressure can be efficiently detected.

Application 5

In the detection device of the aspect of the invention, the plurality of pressure sensors may be disposed in two directions which cross each other.

According to the detection device of the aspect of the invention, the direction and the intensity of the external pressure can be easily calculated from the difference between the pressure values of the pressure sensors which are arbitrarily combined, among the pressure values of the pressure sensors.

Application 6

In the detection device of the aspect of the invention, the plurality of pressure sensors may be disposed in at least 4 rows×4 columns in the two directions which cross each other.

According to the detection device of the aspect of the invention, the number of the pressure sensors disposed is increased. Thus, the detection result of each pressure sensor is integrated based on the pressure values which are detected by the plurality of pressure sensors, and it is possible to determine the direction in which the external pressure is applied. Therefore, the direction of the external pressure can be detected with high accuracy.

Application 7

In the detection device of the aspect of the invention, the elastic protrusion may be formed in plurality in the first substrate, the plurality of elastic protrusions is separated from each other and disposed, and the second substrate may be disposed over the plurality of elastic protrusions.

According to the detection device of the aspect of the invention, variations in a parallel direction in the surface of the second substrate can be allowed when the elastic protrusion is elastically deformed. For example, when one elastic protrusion is deformed, an influence of the deformation in the other one elastic protrusion can be suppressed. Therefore, compared to the case where each of the plurality of elastic protrusions is disposed making contact with each other, the external pressure can be more correctly transferred to each pressure sensor. Thus, the direction and the intensity of the external pressure can be detected with high accuracy.

Application 8

In the detection device of the aspect of the invention, stiffness of the second substrate may be greater than that of the elastic protrusion.

According to the detection device of the aspect of the invention, for example, when the external force is applied to a region between two adjacent elastic protrusions, the two adjacent elastic protrusions can be suppressed to be compressively deformed in the directions which are opposite to each other. That is, a detection error such as detecting the direction opposite to the direction to which the external pressure is applied can be suppressed. Therefore, the direction of the external pressure can be detected with high accuracy.

Application 9

According to another aspect of the invention, there is provided an electronic apparatus including the above-described detection devices.

According to the electronic apparatus of the aspect of the invention, since the electronic apparatus includes the above-described detection devices, it is possible to provide an electronic apparatus capable of detecting the direction and the intensity of the external pressure with high accuracy.

Application 10

According to still another aspect of the invention, there is provided a robot including the above-described detection devices.

According to the robot of the aspect of the invention, since the robot includes the above-described detection devices, it is possible to provide a robot capable of detecting the direction and the intensity of the external pressure with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
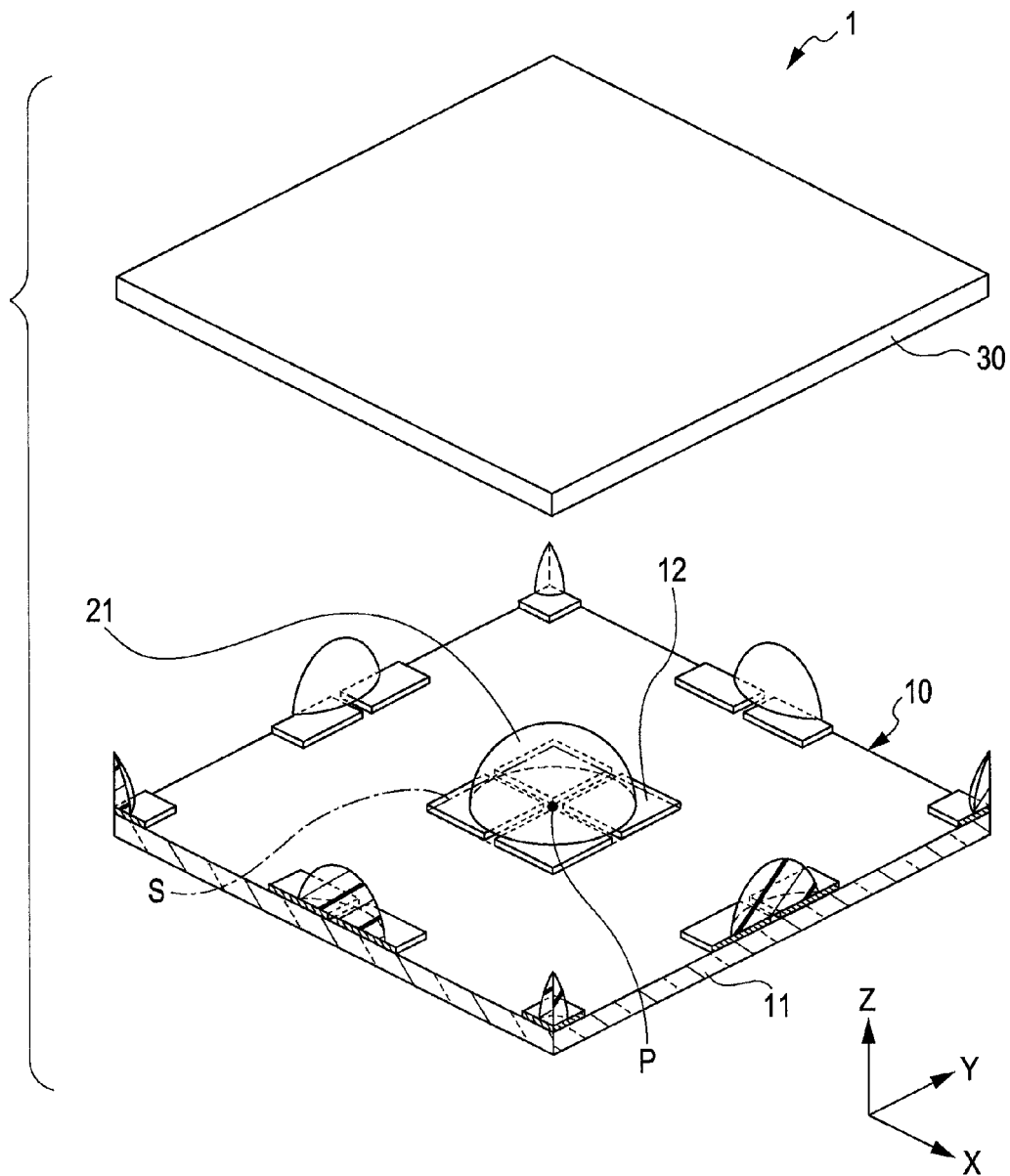
FIG. 1 is an exploded perspective view showing a schematic configuration of a detection device according to a first embodiment of the invention.

Hereinafter, embodiments of the invention will be described reference to the accompanying drawings. The embodiments each describe one aspect of the invention and do not limit the invention. Therefore, the invention can be arbitrarily modified within a scope of the technical idea of the invention. In addition, in the drawings below, for the sake of ease of understanding of each component, the scale and the number or the like between the real configuration and each configuration described in the drawings may be different to each other.

Moreover, in the embodiments, a "surface" of a first substrate indicates a formation surface of a plurality of pressure sensors of a first substrate main body. In addition, a "surface" of a second substrate indicates a surface of a second substrate main body which is opposite to a formation surface of an elastic protrusion, that is, a surface which receives an external pressure.

In the description below, an XYZ orthogonal coordinate system is set in the drawings, and each member will be described reference to the XYZ orthogonal coordinate system. In the XYZ orthogonal coordinate system, an X axis and a Y axis are set in a tangential direction of the surface of the first substrate 10, and a Z axis is set in a normal direction of the surface of the first substrate 10.

First Embodiment

Detection Device

FIG. 1 is an exploded perspective view showing a schematic configuration of a detection device according to a first embodiment of the invention. In FIG. 1, a reference number P indicates a reference point, and a reference number S indicates a unit detection region that is detected by a plurality of pressure sensors 12 which are disposed corresponding to one elastic protrusion 21.

A detection device 1 is a pressure sensor type touch pad that detects the direction and the intensity of the external pressure which is applied to the reference point. For example, the detection device 1 is a pointing device which is used instead of a mouse in an electronic apparatus such as a notebook computer. In addition, the "reference point P" is a point in which a center of the elastic protrusion 21 is disposed when a sliding force is not applied.

As shown in FIG. 1, the detection device 1 includes: the first substrate 10 that includes pressure sensors 12 which are disposed in plurality around the reference point P; an approximately hemispherical elastic protrusion 21 that is positioned so that the center of the elastic protrusion is approximately disposed in a position which is overlapped with the reference point P, and is elastically deformed by an external pressure; and a second substrate 30 that is separated from the elastic protrusion 21 and installed on a side which is opposite to the first substrate 10.

The detection device 1 includes a calculation device 120 (refer to FIG. 4), and the calculation device 120 calculates a difference between pressure values detected by the pressure sensors 12 which are arbitrarily combined, among pressure values which are detected by the plurality of pressure sensors 12 due to the fact that the elastic protrusion 21 is elastically deformed by the external pressure, and calculates the applied external pressure based on the difference.

The first substrate 10 includes a first substrate main body 11 that is formed in a rectangular plate shape and formed of materials such as glass, quartz, or plastic; and the plurality of pressure sensors 12 that is disposed in the first substrate main body 11. For example, the size of the first substrate main body 11 (size in planar view) is about 56 mm length×56 mm width.

The plurality of pressure sensors 12 is disposed to be point symmetrical with respect to the reference point P. For example, the plurality of pressure sensors 12 is disposed in a matrix state in two directions (the X direction and the Y direction) which are perpendicular to each other. Thereby, since distances between the reference point P and the pressure sensors 12 are the same as each other, the relationship between variations in the positions of the center of gravity of the elastic protrusion 21 and the pressure values detected by the pressure sensors 12 is the same as each other. Thus, the difference between the pressure values that are detected by the pressure sensors which are arbitrarily combined among pressure values of the pressure sensors 12 is easily calculated. In addition, the calculation method of the difference of the pressure values will be described hereinafter.

The interval between adjacent pressure sensors 12 is about 0.1 mm. Thereby, noise due to influence such as a disturbance or static electricity is not carried on the pressure values which are detected by the pressure sensors 12 disposed in adjacent positions.

The plurality of pressure sensors 12 is disposed 4 in total with 2 rows in length×2 columns in width per unit detection region S. A center of four pressure sensors 12 (a center of the unit detection region S) becomes the reference point P. For example, the size of the unit detection region S (the size in planar view) is about 2.8 mm length×2.8 mm width. In addition, each area of the four pressure sensors 12 becomes substantially the same. As the pressure sensor 12, for example, a pressure-sensitive element such as a diaphragm gauge may be used. The pressure sensor 12 converts a pressure, which is applied to the diaphragm when the external pressure is applied to a contact surface, to an electrical signal.

The elastic protrusion 21 is disposed in a matrix state in the X direction and the Y direction on the first substrate 10. For example, the elastic protrusion 21 is formed of resin materials such as a urethane foam resin or a silicone resin. In addition, for example, the tip of the elastic protrusion 21 becomes hemispherical in a spherical surface, and makes contact with the second substrate 30.

The second substrate 30 is formed of materials such as glass, quartz, or plastic. In addition, the shape of the elastic protrusion 21 may be hemispherical, and conical or columnar.

The elastic protrusion 21 is formed in plurality in the first substrate 10. In addition, the plurality of elastic protrusions 21 is separated from each other and disposed, and the second substrate 30 is disposed over the plurality of elastic protrusions 21. Therefore, when the elastic protrusions 21 are elastically deformed, variations in a parallel direction in the surface of the second substrate 30 can be allowed.

The size of the elastic protrusion 21 can be arbitrarily set. Here, a diameter of a base portion of the elastic protrusion 21 (a diameter of a portion in which the elastic protrusion 21 makes contact with the first substrate 10) is about 2 mm. A height of the elastic protrusion 21 (a distance in the Z direction of the elastic protrusion 21) is about 1.5 mm. A separation interval between adjacent elastic protrusions 21 is about 1 mm. Durometer hardness of the elastic protrusion 21 (a hardness measurement value measured by ISO7619 Standard Durometer, type A) is about 30.

A detection method of the direction and the intensity of an external pressure applied to the reference point P will be described with reference to FIGS. 2 and 3. FIGS. 2A to 2C are cross-sectional views showing variations in pressure values through pressure sensors according to the first embodiment. FIGS. 3A to 3C are plan views which correspond to FIGS. 2A to 2C and show variations in pressure values through the pressure sensors according to the first embodiment.

Figure 2A:
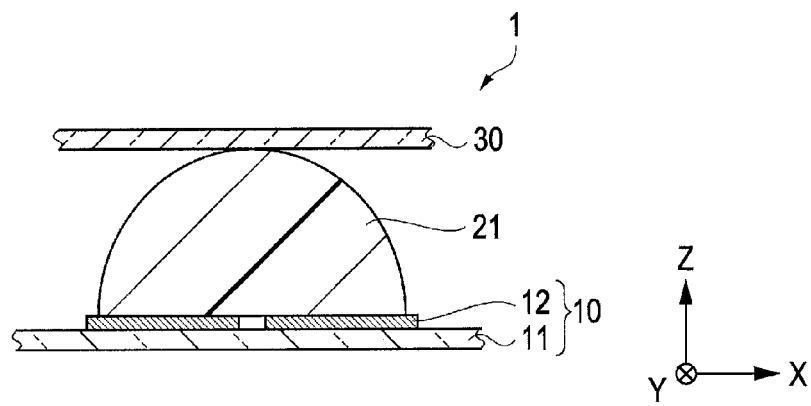
FIGS. 2A to 2C are cross-sectional views showing variations in pressure values through pressure sensors according to the first embodiment.
Figure 3A:
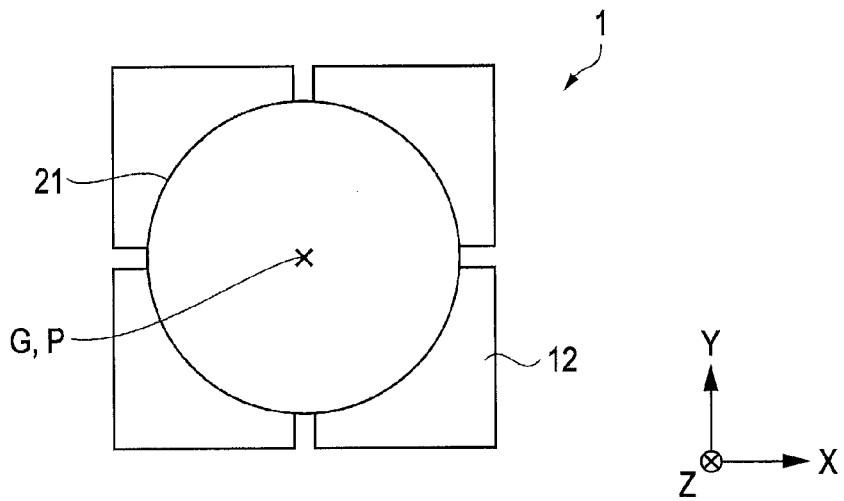
FIGS. 3A to 3C are plan views showing variations in pressure values through pressure sensors according to the first embodiment.

In addition, FIGS. 2A and 3A show states (when the external pressure is not applied) before the external pressure is applied to the surface of the second substrate 30.

Figure 2B:
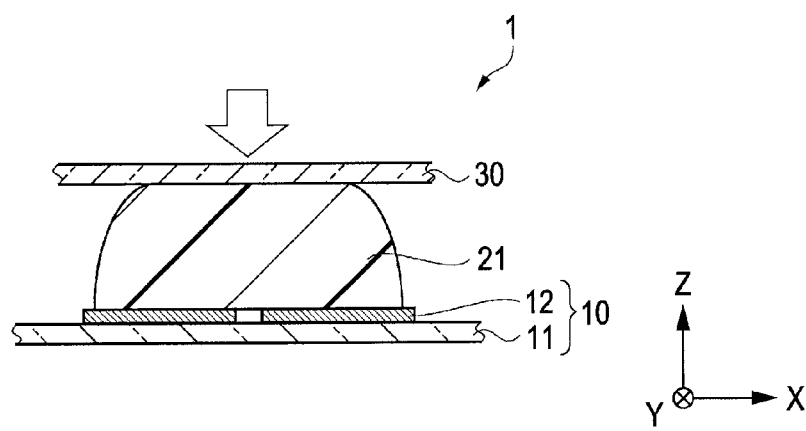
Figure 2C:
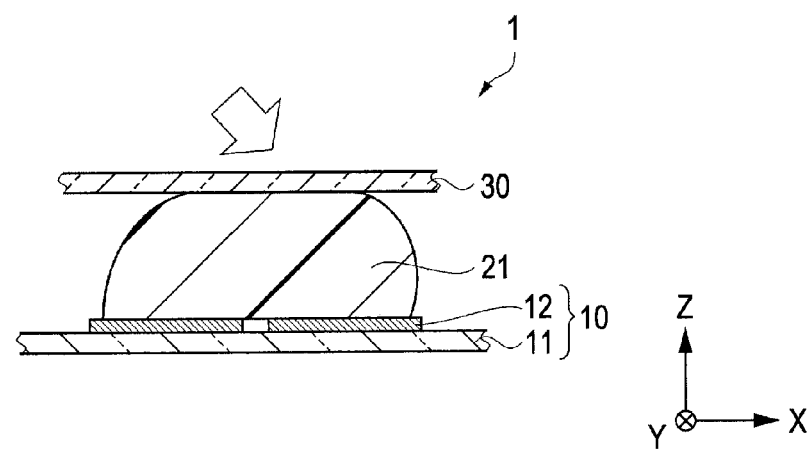
Figure 3B:
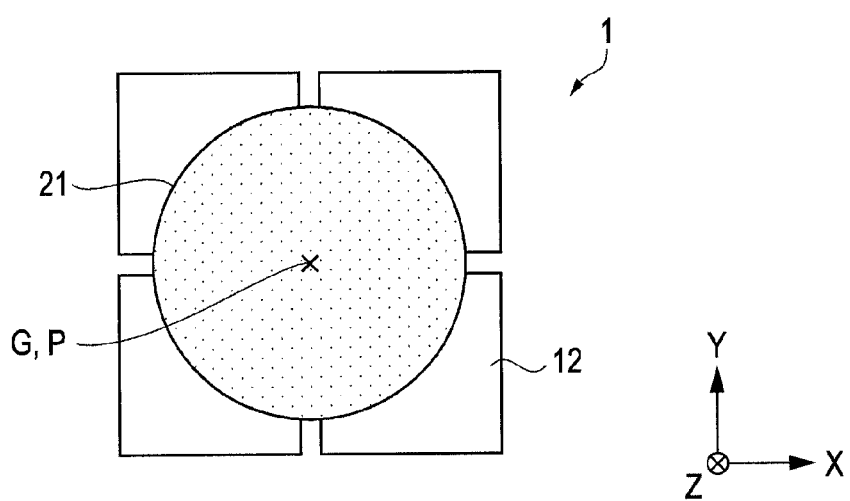

FIGS. 2B and 3B show states (states where a sliding force is not applied) where the external pressure in a vertical direction is applied to the surface of the second substrate 30. FIGS. 2C and 3C show states (states where the sliding force is applied) where the external pressure in an inclined direction is applied to the surface of the second substrate 30.

Figure 3C:
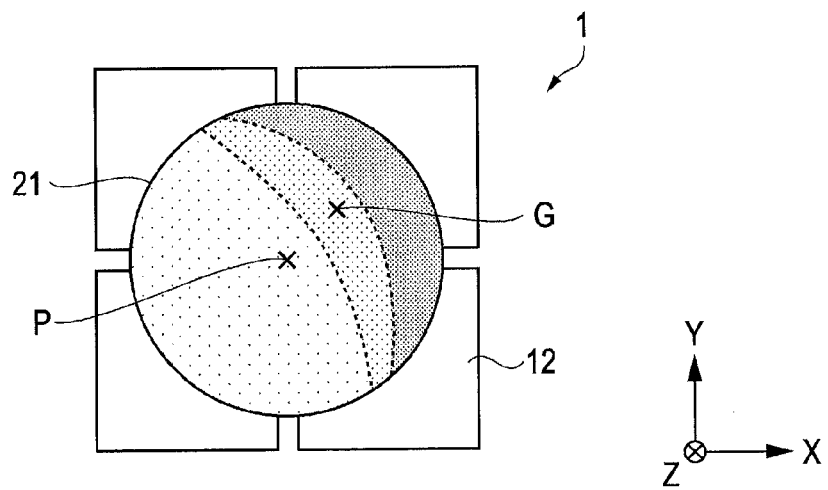

In addition, in FIGS. 3A to 3C, a reference number G indicates the center of gravity (a center of pressure) of the elastic protrusion 21.

As shown in FIGS. 2A and 3A, before the external pressure is applied to the surface of the second substrate 30, the elastic protrusion 21 is not deformed. Thereby, the distance between the first substrate 10 and the second substrate 30 is maintained to be constant. At this time, the center of gravity G of the elastic protrusion 21 is disposed at a position which is overlapped with the reference point P. The pressure value of each pressure sensor 12 at this time is stored on a data memory 124 (refer to FIG. 4) of the calculation device 120. The direction and the intensity in which the external pressure is applied are obtained based on the pressure value of each pressure sensor 12 which is stored on the data memory 124.

As shown in FIGS. 2B and 3B, when the external pressure in the vertical direction is applied to the surface of the second substrate 30, the elastic protrusion 21 is compressively deformed in the Z direction. Thereby, the second substrate 30 is bent toward the −Z direction, and the distance between the first substrate 10 and the second substrate 30 is smaller compared to the one of that the external pressure is not applied. At this time, the pressure value of the pressure sensor 12 is greater compared to the one of that the external pressure is not applied. In addition, the variation is substantially the same as each pressure sensor 12.

As shown in FIGS. 2C and 3C, when the external pressure in the inclined direction is applied to the surface of the second substrate 30, the elastic protrusion 21 is inclined and compressively deformed. Thereby, the second substrate 20 is bent in the −Z direction, and the distance between the first substrate 10 and the second substrate 30 is smaller as compared to the one of that the external pressure is not applied. At this time, the center of gravity G of the elastic protrusion 21 is deviated from the reference point P to the +X direction and the +Y direction. In this case, the pressure values in which the elastic protrusion 21 is applied to the four pressure sensors 12 are different from each other. Specifically, in the pressure values in which the elastic protrusion 21 is applied to four pressure sensors 12, the pressure value that is applied to the pressure sensor 12 disposed in the +X direction and the +Y direction is greater than the pressure value that is applied to the pressure sensor 12 disposed in the −X direction and −Y direction among four pressure sensors 12.

The deviation in the deformation of the elastic protrusion 21 occurs due to the external pressure in the inclination direction. That is, the center of gravity G of the elastic protrusion 21 is deviated from the reference point P, and moved in the sliding direction (the +X direction and the +Y direction). Thereby, different pressure values are detected by pressure sensors 12. Specifically, a relatively great pressure value is detected at the pressure sensor 12 disposed in a position which is overlapped with the center of gravity G of the elastic protrusion 21, and a relatively small pressure value is detected at the pressure sensor 12 disposed in a position which is not overlapped with the center of gravity G of the elastic protrusion 21. In addition, as described hereinafter, the direction and the intensity in which the external pressure is applied is obtained based on the calculation method of the difference.

Figure 4:
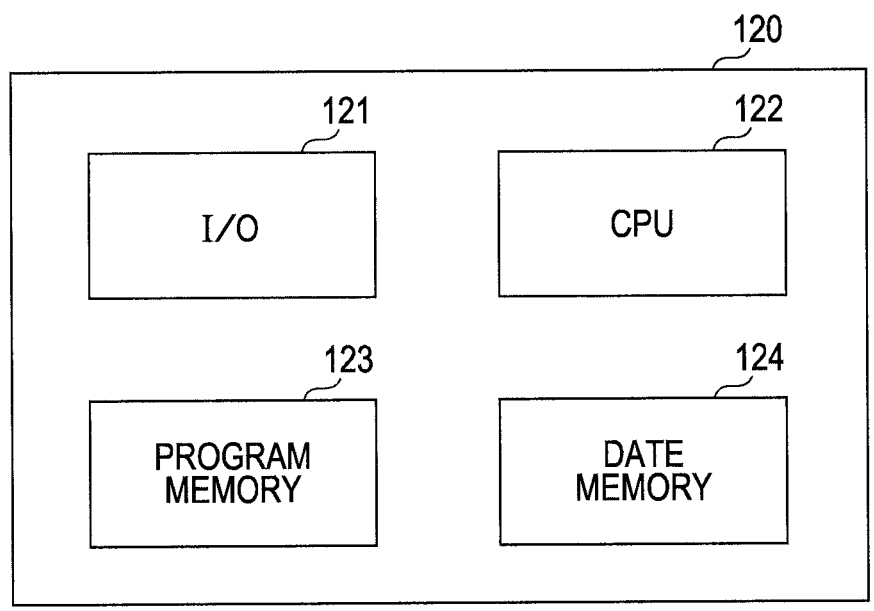
FIG. 4 is an exemplary view showing a calculation device which calculates an external pressure.

FIG. 4 shows an example of a calculation device which calculates the external pressure. The calculation device 120 includes an interface portion (I/O portion) 121 that sends and receives a signal and outputs the calculation result; a CPU 122 that performs various calculations; a program memory 123; and a data memory 124 that stores data.

The calculation device 120 calculates the difference between pressure values detected by pressure sensors 12 (112) which are arbitrarily combined, among pressure values which are detected by the plurality of pressure sensors 12 (112) due to the fact that the elastic protrusion 21 is elastically deformed by the external pressure. Thereafter, the calculation device 120 performs a calculation processing which calculates the direction and the intensity of the applied external pressure based on the difference.

Figure 5:
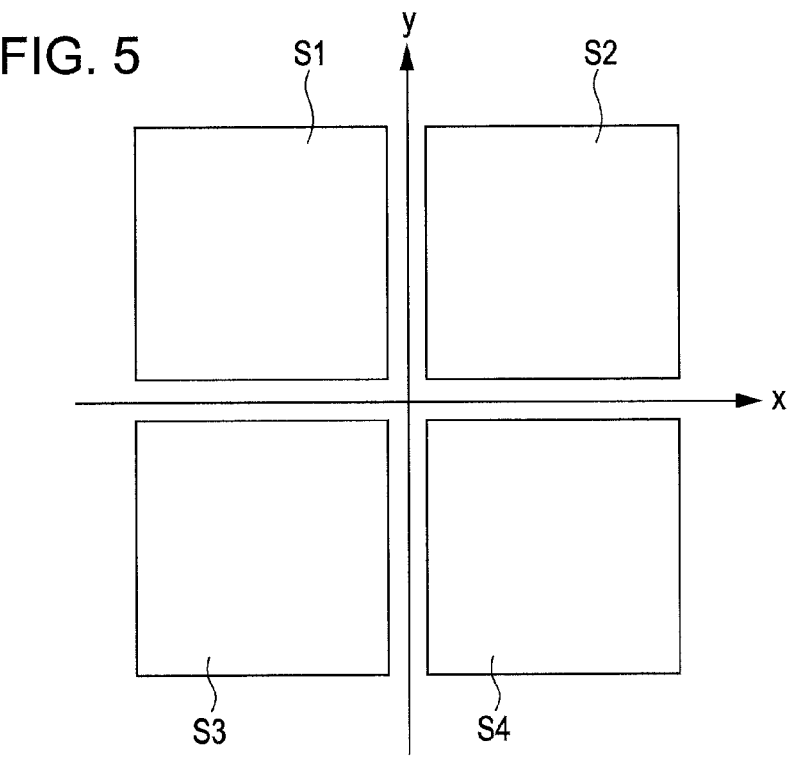
FIG. 5 is a diagram showing a coordinate system of a sensing region according to the first embodiment.
Figure 6:
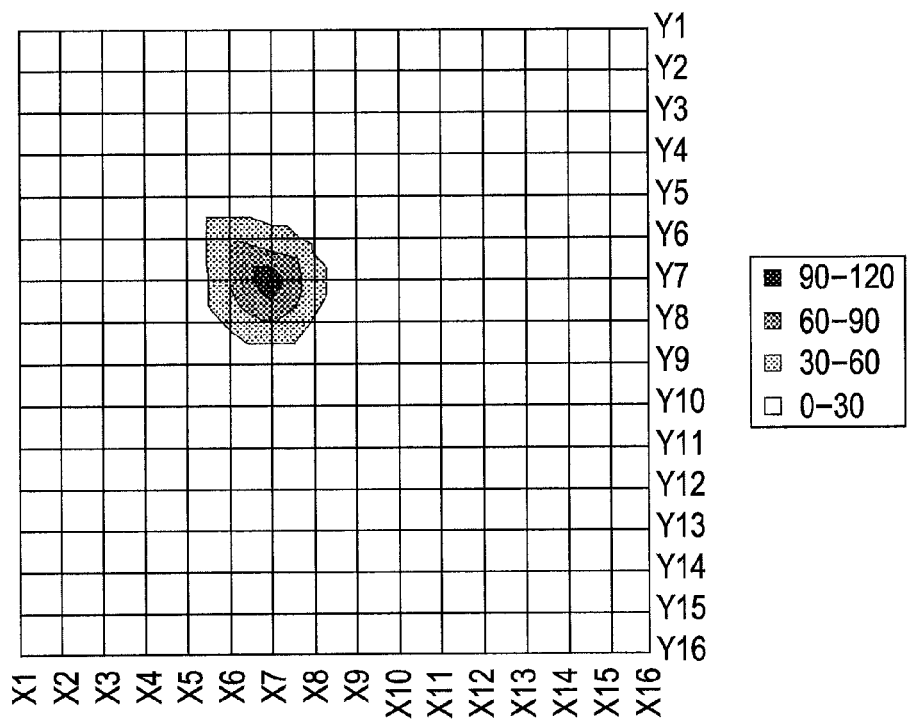
FIG. 6 is a diagram showing a pressure distribution in a vertical direction through the pressure sensor according to the first embodiment.
Figure 7:
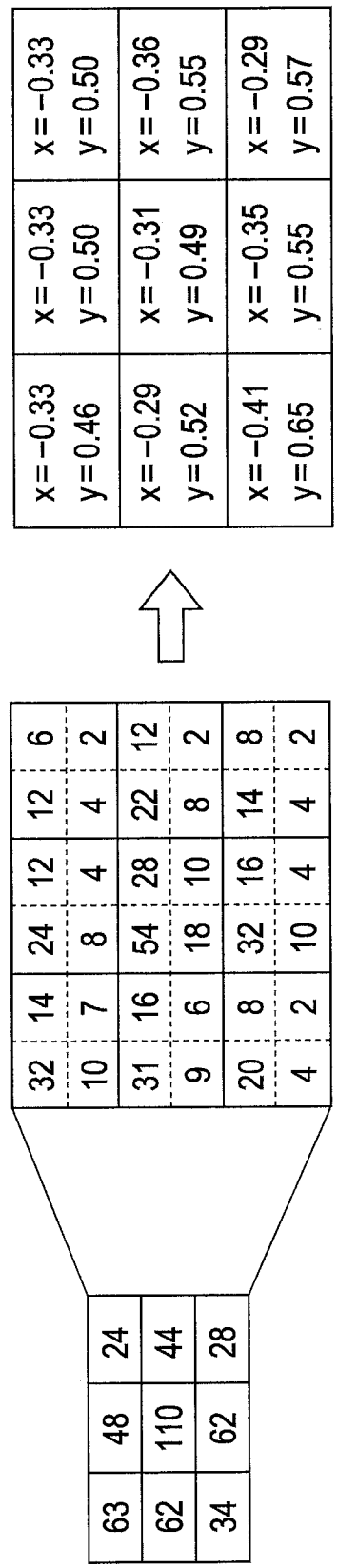
FIG. 7 is a diagram showing a calculation example in a sliding direction through the pressure sensor according to the first embodiment.

FIG. 5 is a diagram showing a coordinate system of a sensing region according to the first embodiment. FIG. 6 is a diagram showing a pressure distribution in a vertical direction through the pressure sensor according to the first embodiment. FIG. 7 is a diagram showing a calculation example in a sliding direction through the pressure sensor according to the first embodiment.

As shown in FIG. 5, the plurality of pressure sensors S1 to S4 are disposed 4 in total with 2 rows in length×2 columns in width per unit detection region S. Here, the pressure values (the detection values) detected by pressure sensors S1 to S4 are given as $P_{S1}$, $P_{S2}$, $P_{S3}$, and $P_{S4}$, and the component Fx in the X direction of the external force (a ratio of the component of the force applied in the X direction to the direction components in the surface to which the external force is applied) is expressed by equation 1 below.

In addition, the component Fy in the Y direction of the external force (a ratio of the component of the force applied in the Y direction to the direction components in the surface to which the external force is applied) is expressed by equation 2 below.

Moreover, the component Fz in the Z direction of the external force (a component in the vertical direction of the external force, and the z axis are omitted in FIG. 3) is expressed by equation 3 below.

$$F_x = \frac{(P_{S2} + P_{S4}) - (P_{S1} + P_{S3})}{P_{S1} + P_{S2} + P_{S3} + P_{S4}} \quad (1)$$

$$F_y = \frac{(P_{S1} + P_{S2}) - (P_{S3} + P_{S4})}{P_{S1} + P_{S2} + P_{S3} + P_{S4}} \quad (2)$$

$$F_z = P_{S1} + P_{S2} + P_{S3} + P_{S4} \quad (3)$$

In the embodiment, the difference between pressure values are calculated, the pressure values are detected by the arbitrarily combined pressure sensors, among the pressure values which are detected by four pressure sensors S1 to S4 due to the fact that the elastic protrusion 21 is elastically deformed by the external pressure, and the direction in which the external pressure is applied is calculated based on the difference.

As shown in the equation 1, in the component Fx in the X direction of the external pressure, among the pressure values which are detected by four pressure sensors S1 to S4, pressure values which are detected by the pressure sensor S2 and the pressure sensor S4 disposed in the +X direction are combined, and pressure values which are detected by the pressure sensor S1 and the pressure sensor S3 disposed in the −X direction are combined. In this manner, the component in the X direction of the external pressure is obtained based on the difference between pressure value through the combination of the pressure sensor S2 and the pressure sensor S4 disposed in the +X direction and pressure value through the combination of the pressure sensor S1 and the pressure sensor S3 disposed in the −X direction.

As shown in the equation 2, in the component Fy in the Y direction of the external pressure, among the pressure values which are detected by four pressure sensors S1 to S4, pressure values which are detected by the pressure sensor S1 and the pressure sensor S2 disposed in the +Y direction are combined, and pressure values which are detected by the pressure sensor S3 and the pressure sensor S4 disposed in the −Y direction are combined. In this manner, the component in the Y direction of the external pressure is obtained based on the difference between pressure value of the combination of the pressure sensor S1 and the pressure sensor S2 disposed in the +Y direction and pressure value through the combination of the pressure sensor S3 and the pressure sensor S4 disposed in the −Y direction.

As shown in the equation 3, the component Fz in the Z direction of the external pressure is obtained from a resultant force which sums the pressure values of four pressure sensors S1 to S4. However, the detection value of the component Fz in the Z direction of the external pressure tends to be more greatly detected compared to those of the component Fx in the X direction of the external pressure and the component Fy (components of the force) in the Y direction of the external pressure.

For example, if the elastic protrusion 21 is formed of hard materials, a detection sensitivity of the component Fz in the Z direction of the external pressure is increased. However, the elastic protrusion 21 is not easily deformed, and the detection values in the directions (the component Fx in the X direction and the component Fy in the Y direction of the external pressure) in the surface of the external pressure are decreased. For example, if an aspect ratio of the elastic protrusion 21 is decreased, the elastic protrusion 21 is difficult to be deformed, and the detection values in the directions in the surface to which the external pressure is applied are decreased.

Thereby, in order to match the detection value of the component Fz in the Z direction of the external pressure with the detection values of the component Fx in the X direction of the external pressure and the component Fy in the Y direction of external pressure, the detection values are necessary to be appropriately corrected by a correction factor which is determined by the material and the shape of the elastic protrusion 21.

As shown in FIG. 6, there is considered a case where the position at the top-left from the center portion of the detection surface of a touch pad is obliquely pressed by a finger. At this time, the pressure in the vertical direction of the external pressure is the greatest in the center portion of the regions to which the external pressure is applied (the output voltage of the pressure sensor is about 90 to 120 mV). In addition, the pressure in the vertical direction of the external pressure decreases in order in regions from the intermediate periphery of the center portion (about 60 to 90 mv) to the outermost periphery (about 30 to 60 mV). Moreover, in the region which is not pressed by the finger, the output voltage of the pressure sensor is about 0 to 30 mV. Further, in the touch pad, the unit detection region (the region in which 4 pressure sensors S1 to S4 are disposed in total with 2 rows in length×2 columns in width) is disposed in a matrix state (for example, 225 in total with 15 rows in length×15 columns in width).

As shown in FIG. 7, there is considered a calculation method of the direction component (the sliding direction) in the surface to which the external pressure is applied in the case where the position at the top-left from the center portion of the detection surface of the touch pad is obliquely pressed by a finger. Those shown in the far left in FIG. 7 indicate an aggregation of nine unit detection regions S, and the expressed values each indicate the values which sum potential values converted from the pressures in which the pressure sensors 12 detect in each unit detection region S. In addition, those shown in the center of FIG. 7 indicate the potential values which are converted from pressures detected by pressure sensors 12 for each unit detection region S, and those shown in the far right indicate the component Fx in the X direction and the component Fy in the Y direction of the external pressure which is calculated for each unit detection region S. At this time, it is assumed that the pressing force of the finger (the external force) is applied to the portions which are disposed in 3 rows in length×3 columns in width among portions which are disposed 15 rows in length×15 columns in width. Here, in the pressure in the vertical direction of the external pressure, similarly to FIG. 6, the pressure of the center portion of the region to which the external pressure is applied is the greatest (110 mV).

Each of unit detection regions S, which are disposed in 3 rows in length×3 columns in width to which the pressing force of the finger is applied, includes four pressure sensors S1 to S4. In addition, the difference between the pressure values are calculated, which are detected by the pressure sensors 12 which are arbitrarily combined among pressure values detected by the pressure sensors S1 to S4, and the direction to which the external pressure applied is calculated based on the difference.

That is, in each unit detection region S, the component Fx in the X direction of the external pressure and the component Fy in the Y direction of the external pressure are calculated based on the equation 1 and the equation 2. Here, that the external pressure is applied in the direction of about 123° in a counterclockwise direction based on the +X direction is understood.

In addition, in the calculation with respect to the direction to which the external pressure is applied, a method which obtains by an average value of nine calculation results, or a method which obtains by a maximum values (for example, the detection value which is greater than a predetermined threshold value) among the nine calculation results can be used.

According to the detection device 1 of the embodiment, if the external pressure applied to the surface of the second substrate 30, the elastic protrusion 21 is elastically deformed. At this time, when there exists the component of the sliding force (the component of the force in the direction parallel to the surface of the pressure sensor 12) in a predetermined direction on the surface, the center of gravity G of the elastic protrusion 21 is deviated from the reference point P and moved in a predetermined direction (the sliding direction). Then, among the plurality of pressure sensors 12, a relatively great pressure value is detected at the pressure sensor 12 which is disposed in the position which is overlapped with the center of gravity G of the elastic protrusion 21, and a relatively small pressure value is detected at the pressure sensor 12 which is disposed in the position which is not overlapped with the center of gravity G of the elastic protrusion 21.

Therefore, the difference between the pressure values detected by the pressure sensors S1 to S4 is calculated, and the direction and the intensity in which the external pressure is applied can be obtained based on the difference. In addition, since the tip portion of the approximately hemispherical elastic protrusion 21 faces the second substrate 30 and is installed in the first substrate 10, even in the state where the sliding force is applied, the horizontal position of the contact surface of the elastic protrusion 21, which comes into contact with the first substrate 10, is not easily deviated. Therefore, after the center of gravity G of the elastic protrusion 21 to which the sliding force is applied and the reference position P are deviated from each other, even in the state where the sliding force is not applied, it is possible to decrease a residual of the deviation between the center of gravity G of the elastic protrusion 21 and the reference position P, or to prevent the deviation from remaining.

In addition, since the tip of the approximately hemispherical elastic protrusion 21, which is disposed so as to face the second substrate 30, is a curved surface, when the external force is applied to the second substrate 30, a stress concentration in a certain portion of the elastic protrusion 21 can be suppressed, and the durability can be improved. Therefore, it is possible to provide the detection device 1 having an improved durability and capable of detecting the direction and the intensity in which an external pressure is applied with high accuracy.

According to the configuration of the embodiment, since the distances between the reference point P and the pressure sensors S1 to S4 are the same as each other, the relationship between variations in the positions of the center of gravity G of the elastic protrusion 21 and the pressure values detected by the pressure sensors S1 to S4 becomes the same as each other. For example, when the plurality of pressure sensors 12 is disposed at the distances which are different to each other from the reference point P, even though variations of the center of gravity G of the elastic protrusion 21 are the same as each other, the pressure values, which are detected by pressure sensors 12, are different to each other. Thereby, the correction factor is necessary according to the disposition position of each pressure sensor 12 when the difference between the detection values is calculated.

However, according to the configuration of the embodiment, since the relationship between variations in the positions of the center of gravity G of the elastic protrusion 21 and the pressure values detected by the pressure sensors S1 to S4 is the same as each other, the correction factor is not necessary. Therefore, it is possible to easily calculate the direction and the intensity of the external pressure from the pressure values which are detected by the pressure sensors S1 to S4, and the external pressure can be effectively detected.

According to the configuration of the embodiment, since the plurality of pressure sensors 12 is disposed in a matrix state in two directions which are perpendicular to each other, it is possible to easily calculate the difference between the pressure values detected by the pressure sensors 12 which are arbitrarily combined among the pressure values detected by the pressure sensors S1 to S4.

For example, when the component Fx in the X direction among the direction components in the surface is calculated, compared to the one of that the plurality of pressure sensors 12 is arbitrarily disposed in a plurality of directions, the combination between the pressure sensor S2 and the pressure sensor S4 which are disposed relatively in the X direction and the combination between the pressure sensor S1 and the pressure sensor S3 which are disposed relatively in the −X direction are classified to each other and easily selected. Therefore, the external pressure can be effectively detected.

According to the configuration of the embodiment, the plurality of elastic protrusions 21 is separated from each other and disposed, and the second substrate 30 is disposed over the plurality of elastic protrusions 21. Therefore, when the elastic protrusions 21 are elastically deformed, variations in the parallel direction in the surface of the second substrate 30 can be allowed. For example, when one elastic protrusion 21 is deformed, an influence of the deformation in the other one elastic protrusion 21 can be suppressed. Thereby, the external pressure can be more correctly transferred to each of the pressure sensors S1 to S4 compared to the case where each of the plurality of elastic protrusions 21 comes into contact with each other and is disposed. Therefore, the direction and the intensity of the external pressure can be detected with high accuracy.

In addition, the embodiment describes an example in which the pressure sensors 12 are disposed 4 in total with 2 rows in length×2 columns in width per unit detection region S. However, the invention is not limited thereto. The pressure sensors 12 may be disposed equal to or more than 3 per unit detection region S.

Second Embodiment

Figure 8:
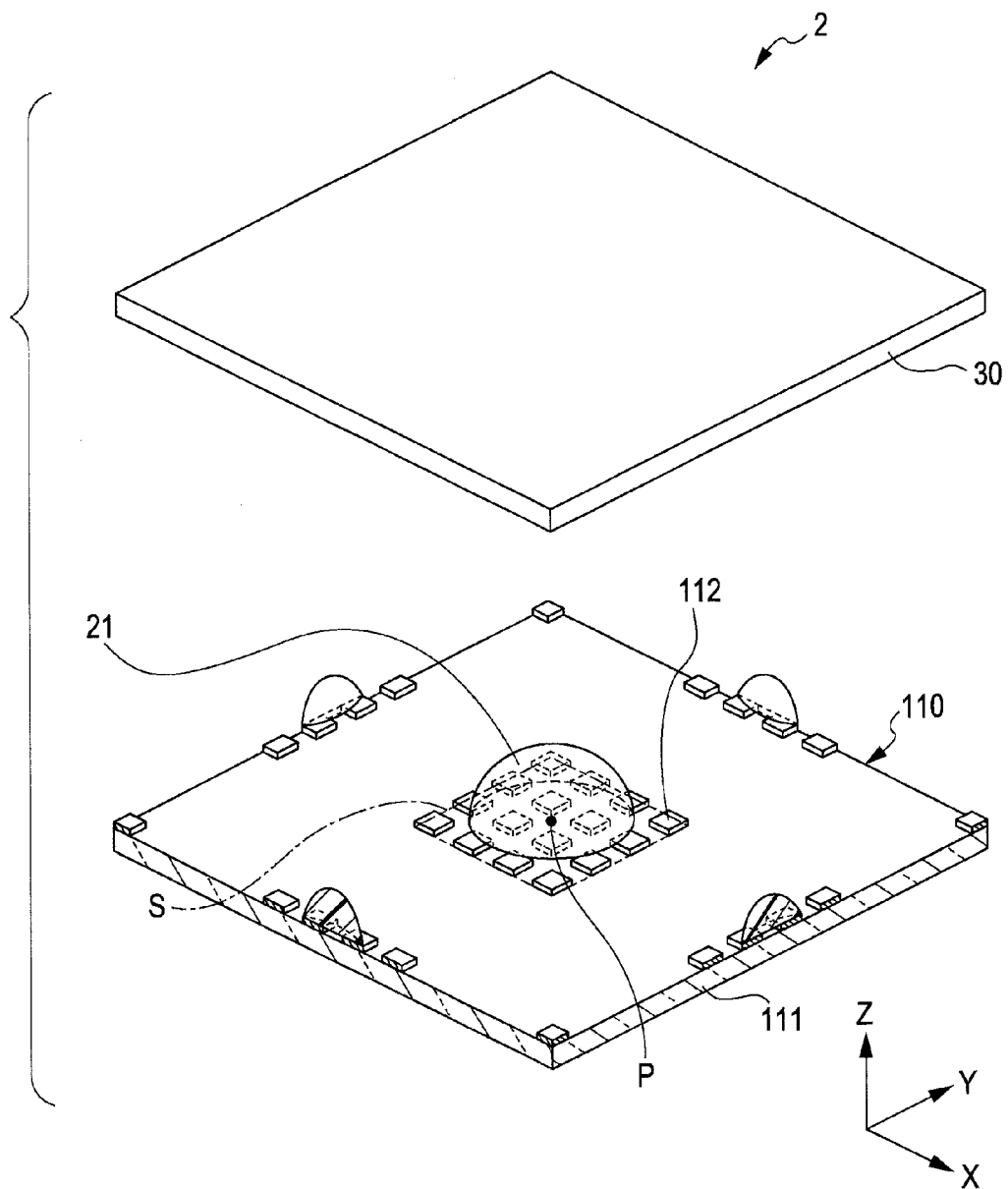
FIG. 8 is an exploded perspective view showing a schematic configuration of a detection device according to a second embodiment of the invention.

FIG. 8 is an exploded perspective view which corresponds to FIG. 1 and shows a schematic configuration of a detection device according to a second embodiment of the invention. In FIG. 8, the same reference numbers are denoted with respect to the same components as FIG. 1, and the detailed description thereof is omitted. In FIG. 8, the reference number P indicates the reference point, and the reference number S indicates the unit detection region in which the plurality of pressure sensors 112, which is disposed corresponding to one elastic protrusion 21, detects.

The detection device 2 of the second embodiment is different to the detection device 1 described in the first embodiment in that the plurality of pressure sensors 112 is disposed in at least 4 rows in length×4 columns in width in two directions which are perpendicular to each other. In addition, in FIG. 8, for convenience, the plurality of pressure sensors 112 is disposed in 4 rows in length×4 columns in width per the unit detection region S. However, in practice, as shown in FIGS. 9 and 10, the plurality of pressure sensors 112 may be disposed equal to or more than 4 rows in length×4 columns in width per unit detection region S.

As shown in FIG. 8, the detection device 2 includes a first substrate 110 that has pressure sensors 112 which are disposed in plurality around the reference point P; an approximately hemispherical elastic protrusion 21 that is positioned so that the center of the elastic protrusion is approximately disposed in a position which is overlapped with the reference point P, and is elastically deformed by an external pressure; and a second substrate 30 that is separated from the elastic protrusion 21 and installed on a side which is opposite to the first substrate 110.

Figure 9A:
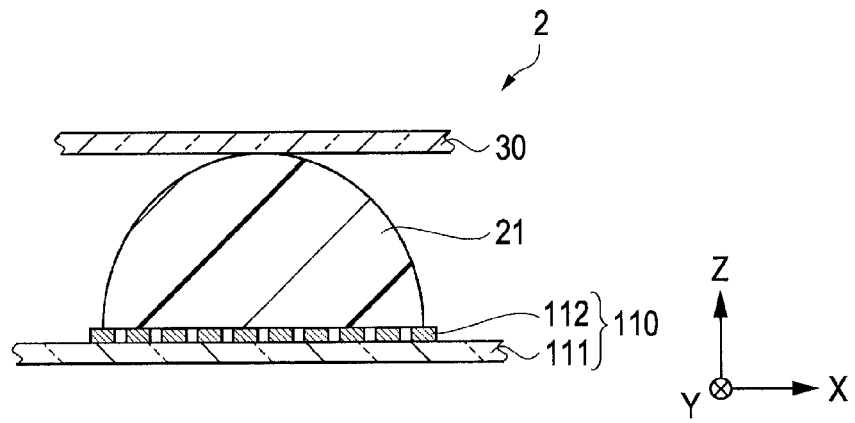
FIGS. 9A to 9C are cross-sectional views showing variations in pressure values through pressure sensors according to a second embodiment.
Figure 9B:
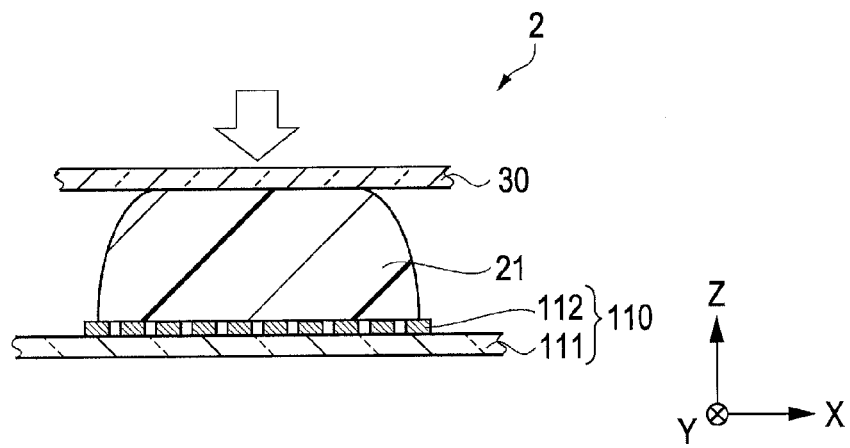
Figure 9C:
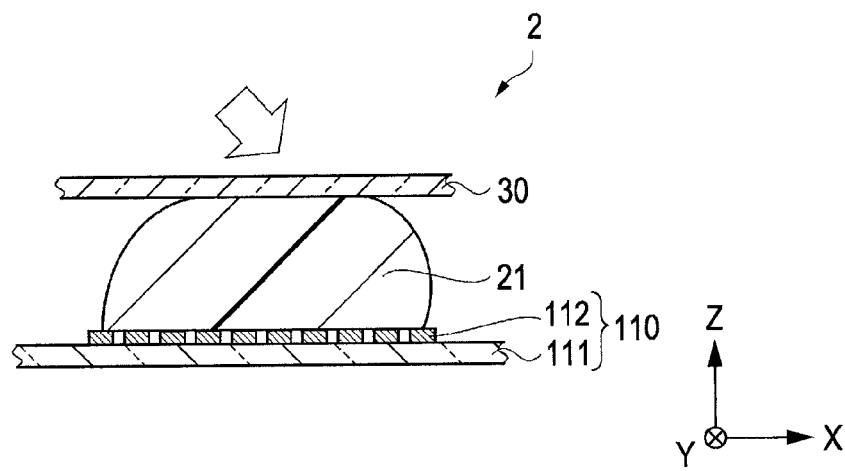
Figure 10A:
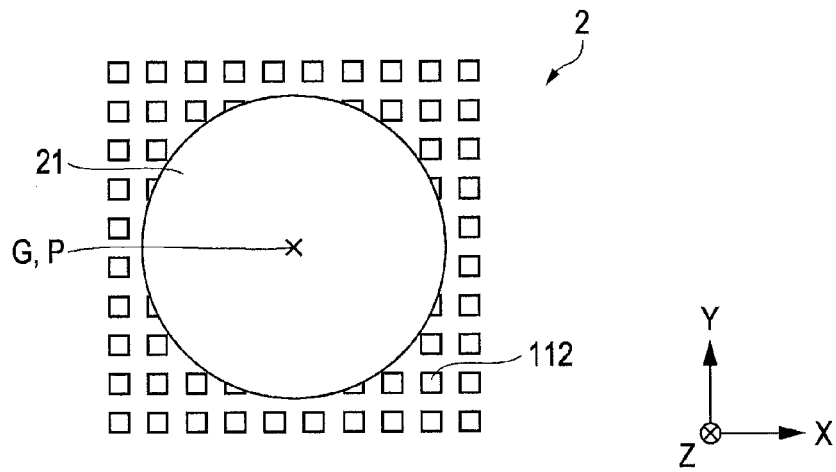
FIGS. 10A to 10c are plan views showing the variations in the pressure values through the pressure sensors according to the second embodiment.
Figure 10B:
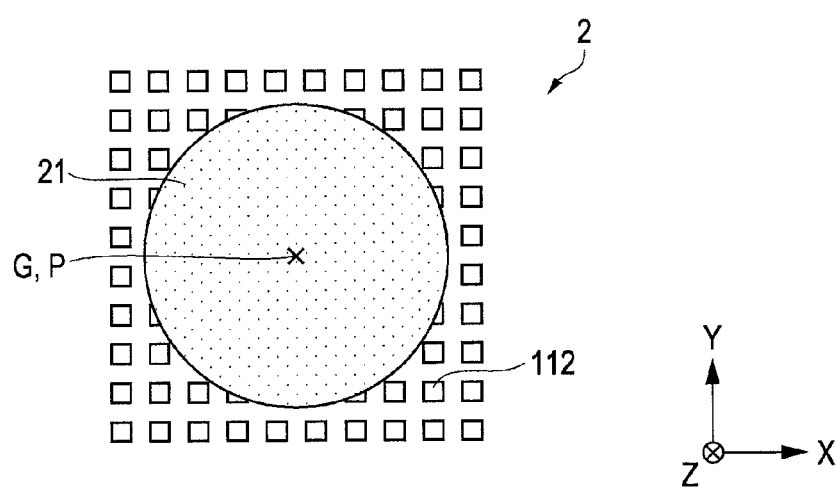
Figure 10C:
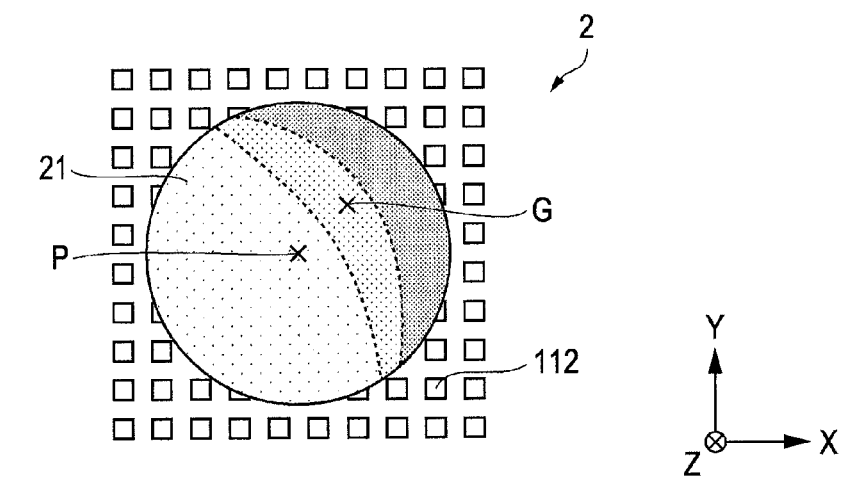

FIGS. 9A to 9C are cross-sectional views which are corresponding to FIGS. 2A to 2C and show variations in pressure values through pressure sensors according to the second embodiment. FIGS. 10A to 10c are plan views which are corresponding to FIGS. 9A to 9C and show the variations in the pressure values through the pressure sensors according to the second embodiment.

In addition, FIGS. 9A and 10A show states (when the external pressure is not applied) before the external pressure is applied to the surface of the second substrate 30. FIGS. 9B and 10B show states where the external pressure in a vertical direction is applied to the surface of the second substrate 30. FIGS. 9C and 100 show states where the external pressure in an inclined direction is applied to the surface of the second substrate 30. In addition, in FIGS. 10A to 10C, reference number G indicates the center of gravity of the elastic protrusion 21. In FIGS. 9A to 9C and FIGS. 10A to 10C, the same reference numbers are denoted with respect to the same components as FIGS. 2A to 2C and FIGS. 3A to 3C, and the detailed description thereof is omitted.

As shown in FIGS. 9A and 10A, before the external pressure is applied to the surface of the second substrate 30, the elastic protrusion 21 is not deformed. Thereby, the distance between the first substrate 110 and the second substrate 30 is maintained to be constant. At this time, the center of gravity G of the elastic protrusion 21 is disposed at a position which is overlapped with the reference point P. The pressure value of each pressure sensor 112 at this time is stored on a data memory 124 of FIG. 4. The direction and the intensity in which the external pressure is applied are obtained based on the pressure value of each pressure sensor 112 which is stored on the data memory 124.

As shown in FIGS. 9B and 10B, when the external pressure in the vertical direction is applied to the surface of the second substrate 30, the elastic protrusion 21 is compressively deformed in the Z direction. Thereby, the second substrate 30 is bent toward the −Z direction, and the distance between the first substrate 110 and the second substrate 30 is smaller compared to the one of that the external pressure is not applied. At this time, the pressure value of the pressure sensor 112 is greater compared to the one of that the external pressure is not applied.

As shown in FIGS. 9C and 10C, when the external pressure in the inclined direction is applied to the surface of the second substrate 30, the elastic protrusion 21 is inclined and compressively deformed. Thereby, the second substrate 30 is bent in the −Z direction, and the distance between the first substrate 110 and the second substrate 30 is smaller compared to the one of that the external pressure is not applied. At this time, the center of gravity G of the elastic protrusion 21 is deviated from the reference point P to the +X direction and the +Y direction. In this case, the pressure values in which the elastic protrusion 21 is applied to the plurality of pressure sensors 112 are different to each other.

Specifically, among the pressures values that the elastic protrusion 21 applies to the plurality of pressure sensors 112, the pressure value that is applied to the pressure sensor 112 disposed in the +X direction and the +Y direction is greater than the pressure value that is applied to the pressure sensor 112 disposed in the −X direction and −Y direction.

Figure 11:
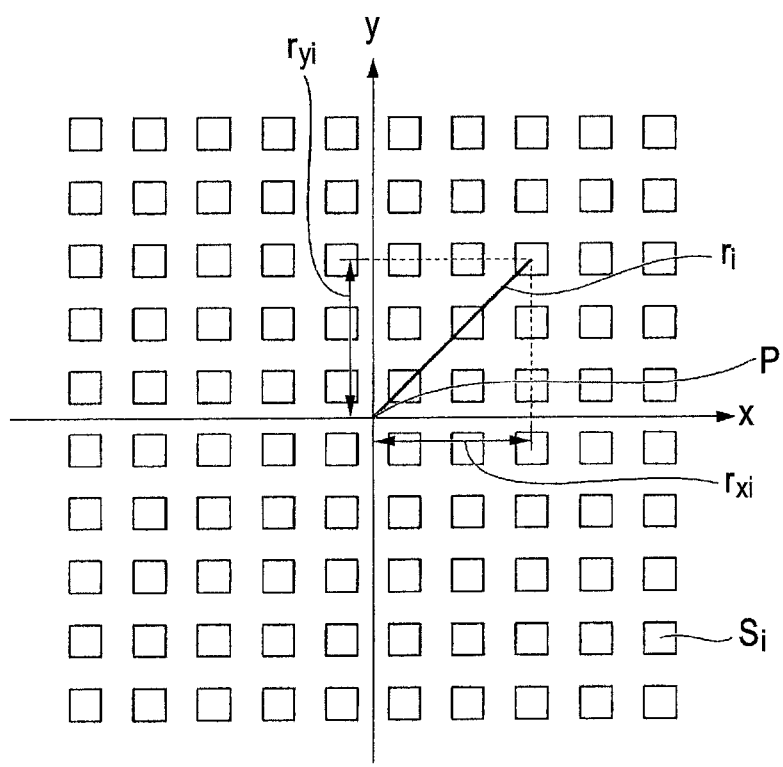
FIG. 11 is a diagram showing a coordinate system of a sensing region according to the second embodiment.

FIG. 11 is a diagram which corresponds to FIG. 5 and shows a coordinate system of a sensing region according to the second embodiment. In addition, in FIG. 11, the plurality of pressure sensors $S_i$ (the number of which is 100) is disposed in a matrix state, 25 of 100 pressure sensors $S_i$ are disposed in a region which is partitioned in the −X direction and the +Y direction, in a region which is partitioned in the +X direction and +Y direction, in a region which is partitioned in the −X direction and −Y direction, and in a region which is partitioned in the +X direction and the −Y direction, respectively. Moreover, in FIG. 11, for convenience, 100 pressure sensors $S_i$ are shown. However, the number of the pressure sensors $S_i$ disposed is not limited thereto, and can be arbitrarily modified.

As shown in FIG. 11, the plurality of pressure sensors $S_i$ is disposed in 100 in total with 10 rows in length×10 columns in width per unit detection region S. Here, the pressure value (the detection value) in which each pressure sensors $S_i$ detects is given as $P_i$ (i=1 to 100), the direction component of the distance between the reference point P and each pressure sensor $S_i$ in the surface is given as $r_i$ (i=1 to 100). In addition, when the component in the X direction of the direction component in the surface is given as $r_{xi}$ (i=1 to 100) and the component in the Y direction of the direction component in the surface is given as $r_{yi}$ (i=1 to 100), component Fx in the X direction of the external force (a ratio of the component of the force applied in the X direction to the direction components in the surface of the external force) is expressed by equation 4 below.

In addition, the component Fy in the Y direction of the external force (a ratio of the component of the force applied in the Y direction to the direction components in the surface of the external force) is expressed by equation 5 below.

Moreover, the component Fz in the Z direction of the external force (component in the vertical direction of the external force) is expressed by equation 6 below.

$$F_x = \frac{\sum_i P_i r_{xi}}{\sum_i P_i} \quad (4)$$

$$F_y = \frac{\sum_i P_i r_{yi}}{\sum_i P_i} \quad (5)$$

$$F_z = \sum_i P_i \quad (6)$$

In the second embodiment, the difference between pressure values are calculated, the pressure values are detected by the arbitrarily combined pressure sensors $S_i$ among the pressure values of 100 pressure sensors $S_i$ which are varied due to the fact that the elastic protrusion is elastically deformed by the external pressure, and the direction to which the external pressure is applied is calculated based on the difference.

As shown in the equation 4, for the component Fx in the X direction of the external pressure, among the pressure values which are detected by 100 pressure sensors $S_i$, values which are detected by the pressure sensor $S_i$ disposed relatively in the +X direction are combined, and values which are detected by the pressure sensors $S_i$ disposed relatively in the –X direction are combined. In this manner, the component in the X direction of the external pressure is obtained based on the difference between the pressure value through the combination of the pressure sensors $S_i$ disposed relatively in the +X direction and the pressure value through the combination of the pressure sensors $S_i$ disposed relatively in the –X direction.

As shown in the equation 5, for the component Fy in the Y direction of the external pressure, among the pressure values of 100 pressure sensors $S_i$, values which are detected by the pressure sensor $S_i$ disposed relatively in the +Y direction are combined, and values which are detected by the pressure sensor $S_i$ disposed relatively in the –Y direction are combined. In this manner, the component in the Y direction of the external pressure is obtained based on the difference between the pressure value through the combination of the pressure sensors $S_i$ disposed relatively in the +Y direction and the pressure value through the combination of the pressure sensors $S_i$ disposed relatively in the –Y direction.

As shown in the equation 6, the component Fz in the Z direction of the external pressure is obtained from a resultant force which sums the pressure values detected by 100 pressure sensors $S_i$. However, the detection value of the component Fz in the Z direction of the external pressure tends to be more greatly detected compared to those of the component Fx in the X direction of the external pressure and the component Fy in the Y direction of the external pressure. Thereby, in order to match the detection value of the component Fz in the Z direction of the external pressure with the detection values of the component Fx in the X direction of the external pressure and the component Fy in the Y direction of external pressure, the detection values are necessary to be appropriately corrected by a correction factor which is determined by the material and the shape of the elastic protrusion 21.

In addition, in the calculation with respect to the direction to which the external pressure is applied, a method of using an average value among the calculation results of the pressure values detected by 100 pressure sensors $S_i$, or a method of using a maximum value (for example, the detection value which is greater than a predetermined threshold value) of the pressure values detected by 100 pressure sensors $S_i$ can be used.

According to the detection device 2 of the second embodiment, since the plurality of pressure sensors 112 is disposed in at least 4 rows in length×4 columns in width in two directions which are perpendicular to each other, the number of the pressure sensors 112 disposed is increased. Thereby, the detection result of each pressure sensor 112 is integrated based on the pressure values detected by the plurality of pressure sensors 112, and it is possible to obtain the direction and intensity in which the external pressure is applied.

Third Embodiment

Figure 12:
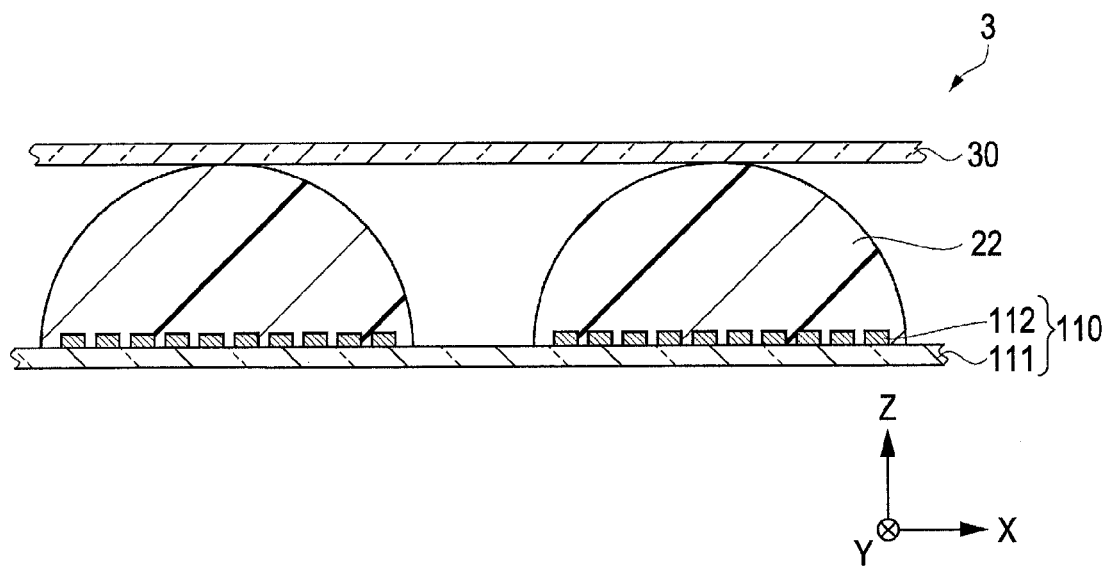
FIG. 12 is a cross-sectional view showing a schematic configuration of a detection device according to a third embodiment.

FIG. 12 is a cross-sectional view corresponding to FIG. 9A showing a schematic configuration of a detection device according to a third embodiment of the invention. In addition, only one elastic protrusion 21 is shown in FIG. 9A, but two adjacent elastic protrusions 22 are shown in FIG. 12. The detection device 3 of the third embodiment is different from the detection device 2 of the above-described second embodiment in that the elastic protrusion 22 is disposed making contact with the first substrate main body 111. In FIG. 12, the same reference numbers are denoted with respect to the same components as FIG. 9, and the detailed description thereof is omitted.

According to the third embodiment, since the elastic protrusion 22 makes contact with the first substrate main body 111 and is disposed, even in the state where the sliding force is applied to the second substrate 30, the horizontal position of the contact surface of the elastic protrusion 22 which comes into contact with the first substrate 110, is not easily deviated. Therefore, after the center of gravity G of the elastic protrusion 22 to which the sliding force is applied and the reference position P are deviated from each other, even in the state where the sliding force is not applied, it is possible to obtain effects such as decreasing a residual of the deviation between the center of gravity G of the elastic protrusion 22 and the reference position, or preventing the deviation from remaining.

Fourth Embodiment

Figure 13:
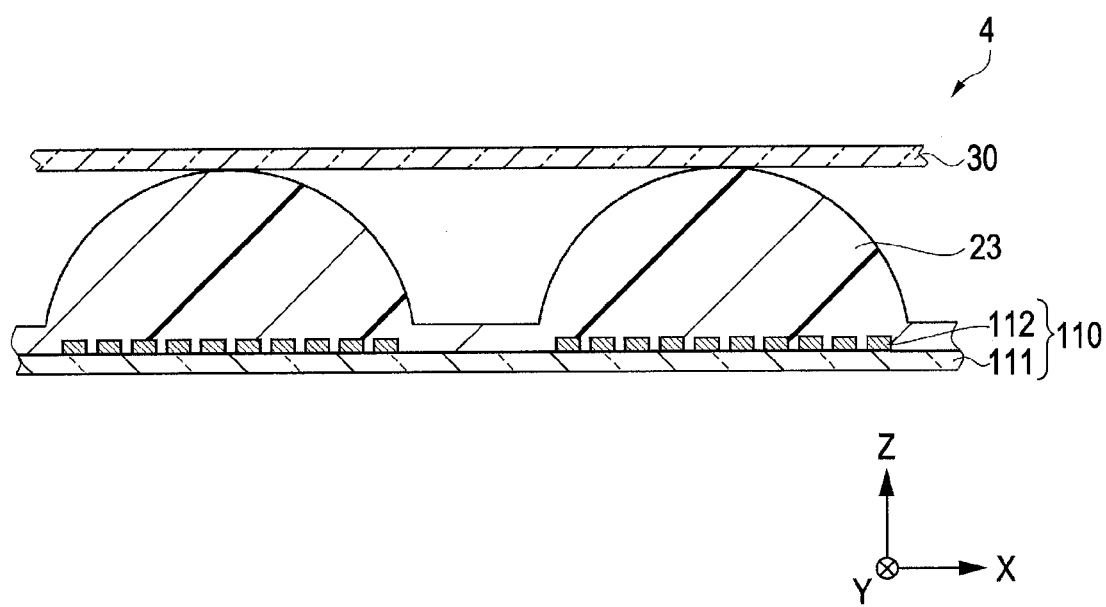
FIG. 13 is a cross-sectional view showing a schematic configuration of a detection device according to a fourth embodiment.

FIG. 13 is a cross-sectional view which corresponds to FIG. 12 and shows a detection device according to a fourth embodiment of the invention.

The detection 4 of the fourth embodiment is different from the detection device 3 of the above-described third embodiment in that adjacent elastic protrusions 23 are integrally formed. In FIG. 13, the same reference numbers are denoted with respect to the same components as FIG. 12, and the detailed description thereof is omitted.

According to the fourth embodiment, since the adjacent elastic protrusions 23 are integrally formed, a contact area of the elastic protrusions 23 with respect to the first substrate 110 is increased, even in the state where the sliding force is applied to the second substrate 30, the horizontal position of the contact surface of the elastic protrusions 23 which come into contact with the first substrate 110, is not easily deviated. Therefore, after the center of gravity G of the elastic protrusion 23 to which the sliding force is applied and the reference position are deviated from each other, even in the state where the sliding force is not applied, it is possible to obtain effects such as decreasing a residual of the deviation between the center of gravity G of the elastic protrusion 23 and the reference position, or preventing the deviation from remaining. In addition, it is possible to integrally mold the elastic protrusions 23 and obtain effects such as easily performing the manufacture.

Fifth Embodiment

Electronic Apparatus

Figure 14:
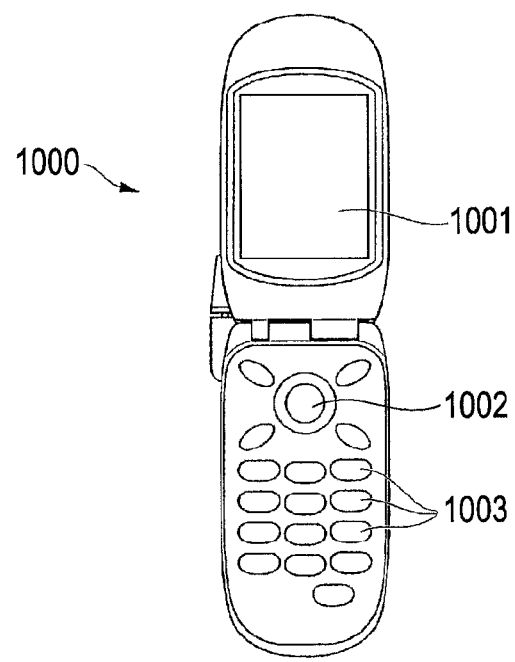
FIG. 14 is a schematic view showing a schematic configuration of a cellular phone as an example of an electronic apparatus.

FIG. 14 is a schematic view showing a schematic configuration of a cellular phone 1000 as an electronic apparatus to which at least one of the detection devices 1 to 4 according to the embodiments is applied. The cellular phone 1000 as the electronic apparatus of the fifth embodiment includes a plurality of operation buttons 1003, a control pad 1002, and a liquid crystal panel 1001 as a display portion. A screen which is displayed on the liquid crystal panel 1001 is scrolled due to the fact that the control pad 1002 is operated. A menu button (not shown) is displayed on the liquid crystal panel 1001. For example, due to the fact that a cursor (not shown) matches the menu button and the control pad 1002 is pressed strongly, a phone book or a telephone number is displayed on the cellular phone 1000.

Figure 15:
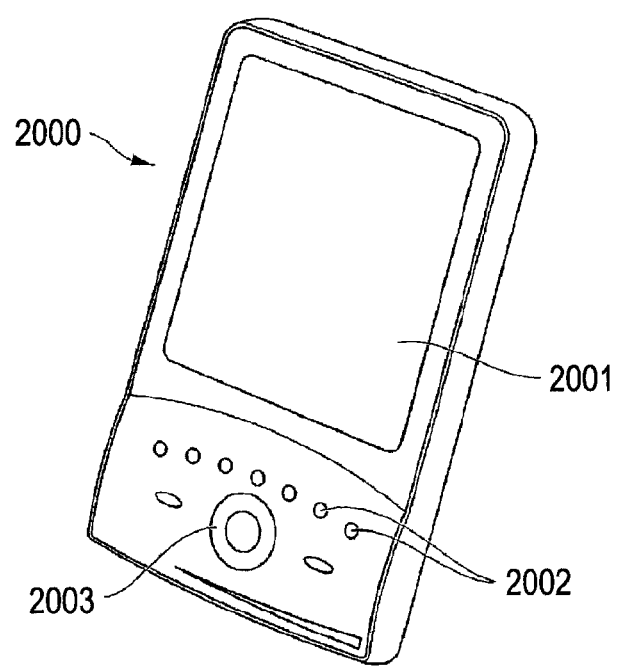
FIG. 15 is a schematic view showing a schematic configuration of a personal digital assistant as an example of an electronic apparatus.

FIG. 15 is a schematic view showing a schematic configuration of a personal digital assistant 2000 to which at least one of the detection devices 1 to 4 according to the embodiments is applied. The personal digital assistant 2000 includes a plurality of operation buttons 2002, a control pad 2003, and a liquid crystal panel 2001 as a display portion. When the control pad 2003 is operated, a menu displayed on the crystal panel 2001 can be operated. For example, due to the fact that a cursor (not shown) is matched to a menu (not shown) and the control pad 2003 is pressed strongly, an address book or a diary is displayed.

According to the electronic apparatus, since the control pads 1002 and 2003 are provided with at least one of the above-described detection devices 1 to 4, it is possible to provide the electronic apparatus capable of detecting the direction and the intensity of the external pressure with high accuracy.

In addition, other than the above-described electronic apparatus, the electronic apparatus may include a personal computer, a video camera monitor, a car navigation device, a pager, an electronic diary, an electronic calculator, a word-processor, a work station, a video phone, a POS terminal, a digital still camera, a touch panel, or the like. At least one of the detection devices 1 to 4 according to the invention can also be applied to the electronic apparatus.

Sixth Embodiment

Robot

Figure 16A:
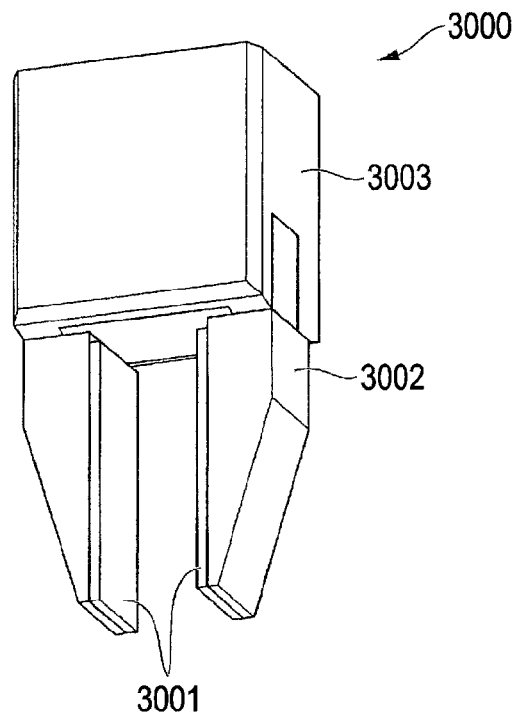
FIGS. 16A and 16B are schematic views showing a schematic configuration of a robot hand as an example of a robot.
Figure 16B:
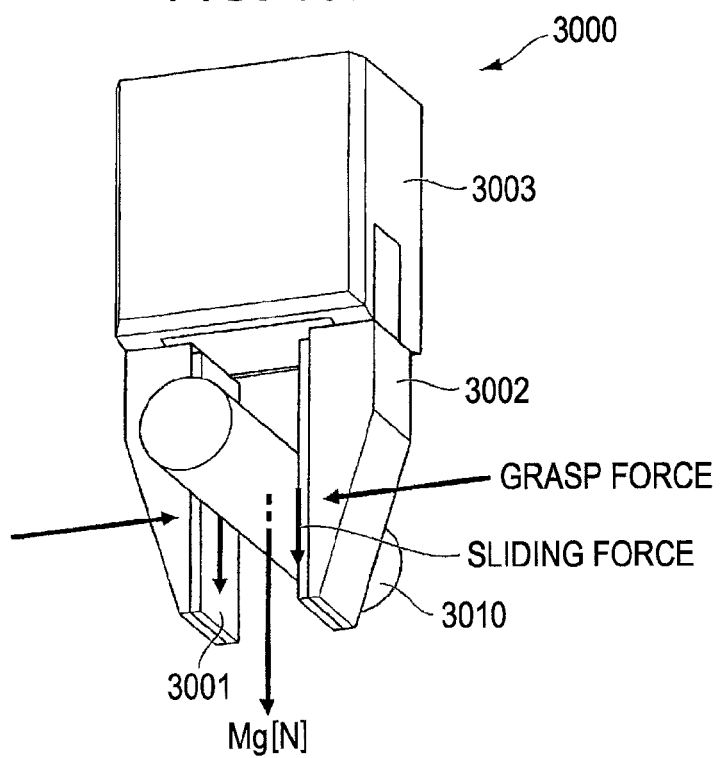

FIGS. 16A and 16B are schematic views showing a schematic configuration of a robot hand 3000 to which at least one of the detection devices 1 to 4 according to the embodiments is applied. As shown in FIG. 16A, a robot hand 3000 of the sixth embodiment includes a main body 3003, a pair of arm portions 3002, and a grasping portion 3001 to which at least one of the detection devices 1 to 4 is applied. For example, when a driving signal is sent to the arm portion 3002 by a control device such as a remote controller, a pair of arm portions 3002 is operated so as to be opened and closed.

As shown in FIG. 16B, a state where an object 3010 such as a cup is grasped by the robot hand 3000 is considered. At this time, the force which is applied to the object 3010 is detected as a pressure through the grasping portion 3001. Since the robot hand 3000 includes at least one of the above-described detection devices 1 to 4 as the grasping portion 3001, it is possible to detect a force in a vertical direction at a surface (a contact surface) of the object 3010 and a force (a component of a sliding force) in a sliding direction by gravity Mg. For example, in order to deform a soft body or not to drop a slippery body, it is possible to hold the object while increasing or decreasing the force according to the texture of the object 3010.

According to the robot, since the robot includes at least one of the above-described detection devices 1 to 4, it is possible to provide a robot capable of detecting the direction and the intensity of the external pressure with high accuracy.

What is claimed is:

1. A detection device comprising:
   a first substrate that includes a plurality of pressure sensors that are disposed around a reference point;
   an elastic protrusion that is positioned so that the center of gravity of the elastic protrusion is disposed in a position which is overlapped with the reference point, and is elastically deformed by an external force;
   a second substrate that is separated from the elastic protrusion and installed on a side which is opposite to the first substrate; and
   a calculation device that calculates a difference between pressure values detected by the plurality of pressure sensors due to the elastic deformation of the elastic protrusion by the external force,
   wherein the elastic protrusion is formed on the first substrate so that a tip portion of the elastic protrusion makes contact with the second substrate, and
   a direction and an intensity of the external force, which is applied from a side of the second substrate, are detected in a state where the tip portion of the elastic protrusion makes contact with the second substrate, and
   the calculation device calculates the direction and the intensity of the applied external force based on the difference.

2. The detection device according to claim 1, further comprising a calculation device,
   wherein the calculation device calculates a difference between pressure values detected by a plurality of pressure sensors which are arbitrarily combined, among pressure values which are detected by the plurality of pressure sensors due to a fact that the elastic protrusion is elastically deformed by the external force, and calculates the direction and the intensity of the applied external force based on the difference.

3. The detection device according to claim 1,
   wherein the elastic protrusion is formed of a resin material having a predetermined hardness, and is hemispherical.

4. The detection device according to claim 1,
   wherein the plurality of pressure sensors is disposed to be point symmetrical with respect to the reference point.

5. The detection device according to claim 4,
   wherein the plurality of pressure sensors is disposed in two directions which cross each other.

6. The detection device according to claim 5,
   wherein the plurality of pressure sensors is disposed in at least 4 rows×4 columns in two directions which cross each other.

7. The detection device according to claim 1,
   wherein a plurality of the elastic protrusions is formed in the first substrate, the plurality of elastic protrusions is disposed separated from each other, and the second substrate is disposed over the plurality of elastic protrusions.

8. The detection device according to claim 1,
   wherein a stiffness of the second substrate is greater than that of the elastic protrusion.

9. An electronic apparatus comprising the detection device according to claim 1.

10. A robot comprising the detection device according to claim 1.

* * * * *